United States Patent [19]

Wöhrl

[11] Patent Number: 4,694,895
[45] Date of Patent: Sep. 22, 1987

[54] APPARATUS FOR SECURING A COMPONENT EXPOSED TO ELEVATED TEMPERATURE TO A THERMALLY INSULATED WALL

[75] Inventor: Bernhard Wöhrl, Gauting, Fed. Rep. of Germany

[73] Assignee: Motoren-und Turbinen-Union Munchen GmbH, Munich, Fed. Rep. of Germany

[21] Appl. No.: 853,473

[22] Filed: Apr. 18, 1986

[30] Foreign Application Priority Data

Apr. 20, 1985 [DE] Fed. Rep. of Germany ....... 3514378

[51] Int. Cl.⁴ .............................................. F28F 13/00
[52] U.S. Cl. .................................... 165/136; 165/135; 248/235
[58] Field of Search ....................... 165/135, 136, 159; 248/235, DIG. 1; 277/12, 166, 178, 189

[56] References Cited

U.S. PATENT DOCUMENTS 3,174,301  3/1965  Thornton et al. ............... 165/135 X
3,263,424  8/1966  Birmann ........................... 60/39.32
3,366,373  1/1968  Reed .................................... 432/222
4,103,099  7/1978  Allsopp ............................ 165/135 X
4,220,685  9/1980  Markow et al ................. 165/135 X
4,258,521  3/1981  Fricker et al. ................... 165/135 X

FOREIGN PATENT DOCUMENTS 0061656  3/1981  European Pat. Off. .

Primary Examiner—Albert W. Davis, Jr.
Assistant Examiner—Richard R. Cole
Attorney, Agent, or Firm—Roberts, Spiecens & Cohen

[57] ABSTRACT

Apparatus for securing a component exposed to a relatively high temperature of a medium on a casing wall provided with thermal insulation to protect the wall from the medium, one section of the casing wall being devoid of thermal insulation and comprising a separate, thermoelastic flexible insulation element sandwiched between two plates, one of which is directly attached to the casing wall and the other of which supports the component. The unit formed by the insulation element sandwiched between the plates compensates for thermal expansion without reducing the casing insulation effect in the area of attachment of the component.

14 Claims, 3 Drawing Figures

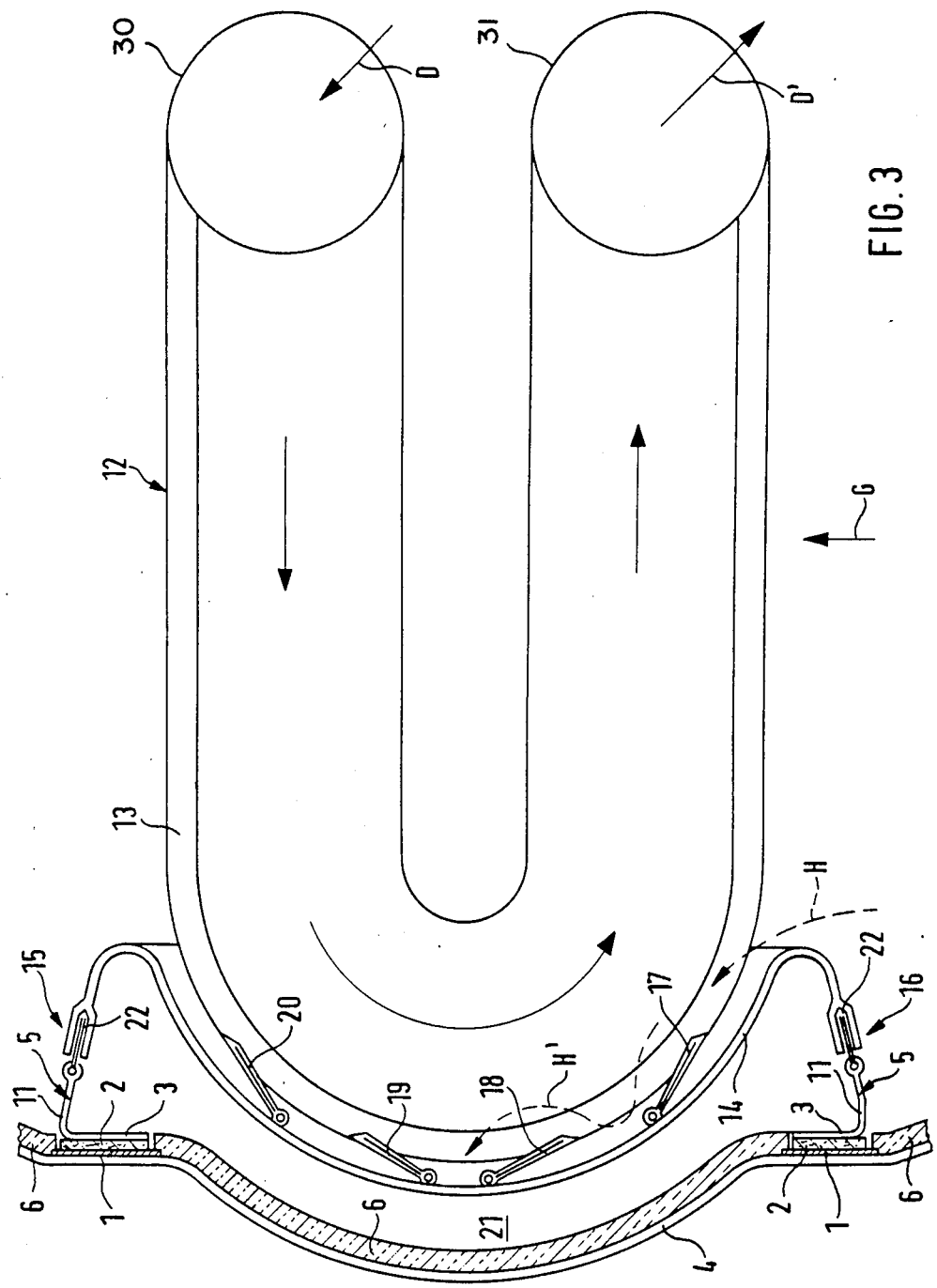

APPARATUS FOR SECURING A COMPONENT EXPOSED TO ELEVATED TEMPERATURE TO A THERMALLY INSULATED WALL

FIELD OF THE INVENTION

The invention relates to apparatus for securing a component exposed to elevated temperature to a thermally insulated wall and particularly to a component which is in contact with a hot gas.

PRIOR ART

In exhaust duct casings of turbo machines or heat exchangers, the supporting structure is often covered with layers of thermally insulating material to protect the structure against internally carried hot gases. In this arrangement, the outer casing wall is to be kept at a temperature that is not injurious to adjacent parts. It is often necessary to fit installed items, such as sealing elements, flow baffles and the like, in the interior of the insulated casing. In this arrangement, the insulation layers should not be torn or used as supporting elements for installed items as this could adversely affect the thermal insulation properties. The casing insulation, on the other hand, is often not suitable for attachment of installed items, because the insulating layers are not sufficiently strong or provide no mechanically suitable retention for installed items on these insulation layers.

Also to be considered in this arrangement are the comparatively extremely differing temperature loads on the components often caused by transient operating conditions of thermal turbomachines, such as gas turbine engines, which in turn result in comparatively severe differences in thermal expansions of the components, which additionally aggravates the intended attachment of components to thermal insulation layers.

SUMMARY OF THE INVENTION

An object of the present invention is to provide attachment means for attaching a component to a thermally insulated casing which compensates for thermal expansions and which is operationally stable, without unduly reducing the thermal insulation effect or mechanically imparing the insulation layer.

In accordance with the above and further objects of the invention, an attachment means is provided for a section of the casing wall devoid of thermal insulation and the attachment means comprises a separate thermoelastic flexible insulating element dimensioned to fit into the section of casing wall which is devoid of thermal insulation. The insulating element has plates secured to both surfaces thereof such that the insulating element is sandwiched between the plates. One of the plates is directly attached to the casing wall, while the other plate faces inwardly of the wall and serves as a means for the attachment of the component.

The insulating element and the plates thereon effectively form a support unit for the component and provide thermal insulation for the casing wall in the section thereof devoid of insulation while providing for dimensional changes due to thermal effects.

In this manner, a mechanically and thermally stable attachment means is provided. The construction of the insulation elements in conjunction with the relative arrangement of lateral plates or baffles, enables operationally safe attachment to the casing and also operationally safe attachment of the components to the casing through the insulation element such that the insulation effect in the respective casing wall area is not impaired. Thermal component expansions are properly compensated without jeopardizing the attachment, the insulation effect or mechanically or thermally weakening the respective casing.

BRIEF DESCRIPTION OF THE FIGURES OF THE DRAWING

FIG. 3 is a diagrammatic sectional view of a portion of a heat exchanger in which the attachment means of the invention is employed.

DETAILED DESCRIPTION OF THE PREFERRED EMBODIMENT OF THE INVENTION

Figure 1:
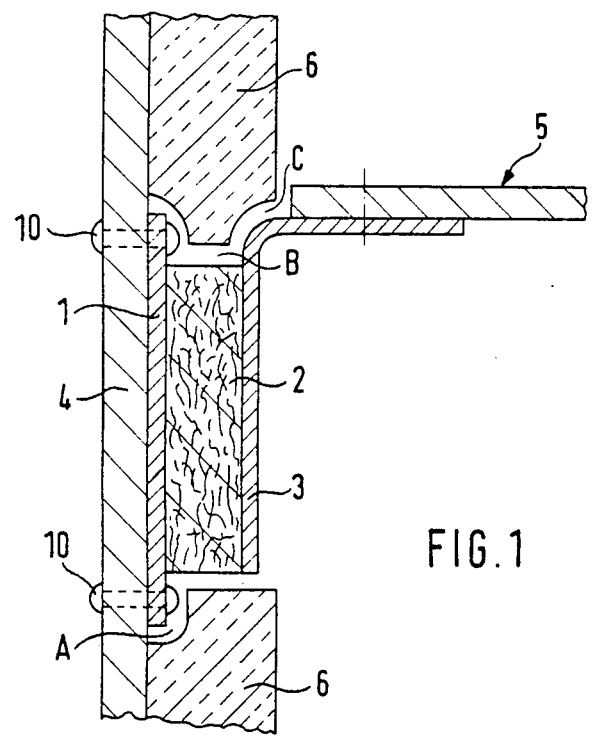
FIG. 1 is a sectional view of a casing with the attachment means of the invention.

FIG. 1 shows a portion of a casing wall 4 which contains a flowing high temperature medium such as a hot gas. The casing wall 4 is internally fitted with thermal insulation 6 to protect the wall from the medium. A component 5 is to be attached to the wall 4. In accordance with the present invention, a section of the casing wall 4 is devoid of thermal insulation 6 and is essentially filled by a separate, thermoelastically flexible insulation element 2. The insulation element 2 is embedded between plates 1, 3 in the form of metal sheets. Plate 1 is directly attached to the casing wall 4 and plate 3 serves as a duct wall section and concurrently as support means for the component 5.

According to a preferred aspect of the present invention, the flexible insulation element 2 is manufactured from a metal felt layer. Depending on the forces to be absorbed and on the allowable relative movements, the metal felt layer may have various thicknesses and relative densities.

In another preferred aspect of the present invention, the plates 1, 3 are brazed to the metal felt layer. In this arrangement, it is important that the metallic content of the metal felt layer be sufficiently great and on the other hand, that the material plates permit proper brazing.

Plate 1 is attached to the casing wall 4 by rivets 10, but the attachment can be by brazing, welding, bolting, or the like.

For reasons of installation and also for thermal reasons, it is desirable for the plates 1, 3 of the metal felt layer 2, and the component 5 be spaced at suitable distances A, B, C relative to the remaining casing wall insulation 6.

Figure 2:
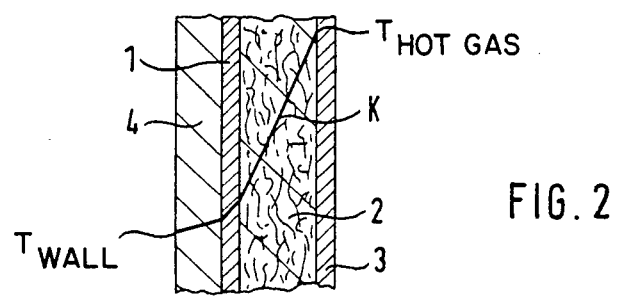
FIG. 2 shows a section of FIG. 1 on which a curve is plotted which represents the temperature gradient between the hot gas side and the casing wall.

According to a further advantageous aspect of the present invention, the means used in the described arrangement permit a relatively steep temperature gradient, as shown by the temperature profile K in FIG. 2, between plate 3 exposed to the relatively hot medium, e.g. hot gas, and the comparatively cool casing wall 4.

In accordance with FIG. 1, the plate 3 serves as a retaining means for component 5 and for this purpose is bent at one end away from the casing wall 4. The plate 3 could also be provided with several lateral bends or laterally projecting support plates for the purpose of retaining the component or stiffening the wall.

Also, several means of this type can be attached, as required, in locally different places on the casing wall as shown in FIG. 3.

The components used in the respective arrangement can be aerodynamically torturous means, flow deflection or baffle plates, seal carriers 11 (FIG. 3), strut vanes or guide vanes or the like.

As more fully illustrated in detail in FIG. 3, the casing wall 4 lined with the insulation 6 can be the outer casing wall of a heat exchanger, where the insulation 6, as well as the plates 3 (serving as support means for components 5) are wetted by hot gases G. More particularly in FIG. 3 there is seen a heat exchanger which comprises an assembly or matrix 12 of heat exchanger tubes 13 of U-shape which are positioned within a housing formed by casing wall 4 such that heated gases G can flow across the tube matrix 12 in the direction of the arrow from an inlet region in the housing below the matrix in FIG. 3 to an outlet region in the housing above the matrix in FIG. 3. The tubes 13 of the matrix 12 are arranged in spaed staggered relation in rows and columns as well known in the art as exemplified in Ser. No. 677,190.

The U-shape tubes 13 of the matrix 12 have straight legs respectively connected to inlet and outlet ducts 30, 31. The ducts 30 and 31 extend substantially parallel to one another in a direction perpendicular to the flow of gases G. The matrix 12 projects transversely from the ducts and extends along the length of the ducts. An operating fluid, such as compressed air, is supplied to the tubes 13 of the matrix at D at duct 30 and the operating fluid flows through the interior of the tubes and is discharged at D' from duct 31 for supply to a utilization means, such as the combustion chamber of a gas turbine engine. In the course of travel of the compressed air through the tubes, the compressed air is heated by the gases G flowing around the exterior of the tubes so that the compressed air supplied to duct 31 from the tubes 2 is heated.

The U-shaped tubes 13 have curved U-portions connected to the straight legs and the compressed air flowing in the tubes undergoes reversal of direction in the curved U-portions. The curved U-portions of the tubes are surrounded by casing wall 4 with its internal insulation 6.

Between wall 4 and the curved U-portions of the tubes 13 of the matrix is a wall element 14 in the form of a cover shell which is subjected to operational movements, particularly thermally induced movements. Seals 15, 16 are provided between wall 4 and wall element 14 to prevent flow of gases G therebetween. The seals 15, 16 are constructed to accommodate relative movements of wall 4 and wall element 14, for example due to thermal effects. The components 5 referred to in FIG. 1 are constituted as seal carriers 11 of the seals 15 in FIG. 3 which compensate for relative movement between the outer casing wall 4 and the adjacent wall element 14. The wall element 14, in turn, can undergo differential movements with respect to the matrix 12 and brush seals 17, 18, 19, 20 are attached to the wall element 14 for contacting the curved U-portions of the tubes 13 for sealing purposes while accommodating any relative movement of wall element 14 and the tubes of the matrix. The seals 15, 16 prevent the flow of hot gases into the intermediate space 21 between the wall element 14 and the casing wall 4 as such flow would not effectively participate in the heat exchange process. The hot gases G flow within shell 14 in the direction of arrow H to the curved U-portions of the tubes of the matrix. The combination of the shell 14 with the brush seals 17, 18, 19, 20 produces a meandering forced flow H' of the hot gases to provide a combination of cross flow and counterflow heat exchange in the outer region of the curved U-portions of the matrix 12.

The seals 15, 16 are also in the form of brush seals and at one end are attached to the components 5 and on the other end sealingly engage in spaces 22 of forked ends of the wall element 14.

As seen the invention provides support units constituted by the insulating element 2 and the plates 1 and 3 thereon whereby the components can be attached to the casing wall without any substantial reduction in the thermal insulation of the wall despite the removal of thermal insulation 6 where the support units are attached to the casing wall. Moreover, the support units provide for dimensional changes due to thermal effects by virtue of the utilization of the metal felt layer 2 sandwiched between the plates.

The apparatus of the invention is also suitable for use on hot gas-carrying, thermally insulated casing structures of gas turbine engines or jet engines.

It will become apparent to those skilled in the art that numerous modifications and variations can be made in the disclosed embodiments without departing from the scope and spirit of the invention as defined in the attached claims.

What is claimed is:

1. Apparatus for securing a component exposed to the relatively high temperature of a medium on a casing wall having thermal insulation to protect said wall from said medium, said casing wall comprising a section devoid of thermal insulation, a separate thermoelastic flexible insulating element dimensioned to fit into the section of casing wall devoid of thermal insulation, said insulating element having opposite surfaces, plates on both surfaces of said insulating element sandwiching said insulating element between said plates, means attaching one of said plates directly to the casing wall, the other plate facing inwardly of said wall and means attaching the component to said other plate.

2. Apparatus as claimed in claim 1 wherein said flexible insulating element consists of a layer of metal felt.

3. Apparatus as claimed in claim 2 wherein said plates are brazed to the metal felt layer.

4. Apparatus as claimed in claim 2 wherein said plates and said metal felt layer are spaced from the insulation on said casing wall.

5. Apparatus as claimed in claim 2 wherein said plates and said metal felt layer provide a steep temperature gradient between said other plate and said casing wall.

6. Apparatus as claimed in claim 2 where said other plate includes a lateral bend to provide a section projecting away from said casing wall.

7. Apparatus as claimed in claim 1 wherein said insulating element and said plates thereon form a support unit for the component, said support unit providing thermal insulation for said casing wall in said section thereof devoid of insulation while providing for dimensional changes due to thermal effects.

8. The combination comprising a casing wall exposed to the relatively high temperature of a fluid medium, thermal insulation on said wall to protect said wall from said medium, a component attached to said casing wall, said casing wall comprising a section devoid of said thermal insulation, a separate thermoelastic flexible insulating element dimensioned to fit into the section of casing wall devoid of thermal insulation, said insulating element having opposite surfaces, plates on both surfaces of said insulating element sandwiching said insulating element between said plates, means attaching one of said plates directly to the casing wall, the other plate facing inwardly of said wall and means attaching the component to said other plate.

9. Apparatus as claimed in claim 8 wherein said casing wall is the outer casing of an engine.

10. Apparatus as claimed in claim 8 wherein said casing wall is the outer casing of a heat exchanger.

11. Apparatus as claimed in claim 10 wherein said component comprises a seal carrier.

12. Apparatus as claimed in claim 10 wherein said component is integral with said other plate.

13. Apparatus as claimed in claim 10 wherein the heat exchanger comprises a matrix of U-shaped tubes, a shell surrounding said matrix at the curved U-portions thereof, said shell being spaced from said casing wall, seals connected to said shell and casing wall for sealing the space therebetween, said seals including said components.

14. Apparatus as claimed in claim 13 wherein said seals include seal carriers which constitute said components.

* * * * *